United States Patent [19]

Sugie et al.

[11] Patent Number: 4,528,346

[45] Date of Patent: Jul. 9, 1985

[54] RESIN COMPOSITION

[75] Inventors: Toshinori Sugie; Ryoichi Ishikawa, both of Takaishi; Fumihiro Kobata, Izumi, all of Japan

[73] Assignee: Dainippun Ink and Chemicals, Inc., Tokyo, Japan

[21] Appl. No.: 531,697

[22] Filed: Sep. 13, 1983

[30] Foreign Application Priority Data

Sep. 17, 1982 [JP] Japan ................. 57-160872
Sep. 18, 1982 [JP] Japan ................. 57-162977
Sep. 28, 1982 [JP] Japan ................. 57-167685
Oct. 5, 1982 [JP] Japan ................. 57-175210
Mar. 10, 1983 [JP] Japan ................. 58-38277

[51] Int. Cl.$^3$ ........................................... C08F 283/00
[52] U.S. Cl. ................... 525/523; 525/537; 525/430; 525/438; 525/463; 525/396; 525/423; 525/471
[58] Field of Search ............... 525/523, 537, 430, 438, 525/463, 396, 423, 471

[56] References Cited

U.S. PATENT DOCUMENTS 4,370,292 1/1983 Yanase et al. ................. 525/523

Primary Examiner—Melvyn I. Marquis
Attorney, Agent, or Firm—Sherman & Shalloway

[57] ABSTRACT

A resin composition comprising (A) a polyphenylene sulfide, (B) an epoxy compound, and as an optional component, a reinforcing material, a filler and/or a fire retardant.

7 Claims, No Drawings

RESIN COMPOSITION

This invention relates to a polyphenylene sulfide resin composition having a stably increased melt viscosity and excellent moldability.

Polyphenylene sulfide (to be abbreviated as PPS) finds application in injection molding in the main and in other uses because of its excellent properties as engineering plastics such as excellent chemical resistance, heat resistance and electrical insulation. To use it in a wider range of application, its moldability should be increased by increasing its melt viscosity.

Industrially, PPS has previously been produced, for example, by the method of U.S. Pat. No. 3,354,129. It is known however that because the resulting PPS is of low molecular weight, does not have sufficient strength and has a low-melt viscosity, it is difficult to produce even pellets from it. Methods for increasing the strength of molded articles of PPS and improving the moldability of PPS which comprise increasing the molecular weight of PPS by oxidatively crosslinking low-molecular-weight PPS in the air at a temperature below its melting point were proposed in U.S. Pat. Nos. 3,699,087, 3,717,620, 3,725,362 and 3,793,256. High-molecular-weight PPS produced by these methods is now used industrially. But, the stability of the melt viscosity of such high-molecular-weight PPS obtained by oxidatively crosslinking is not sufficient, and good strands are difficult to obtain in the production of pellets from it. This causes problems, for example with regard to the stability of feeding the pellets to a feeder during injection molding. Naturally, extruded articles such as sheets, films or pipes cannot be obtained from such high-molecular-weight PPS because a higher level of extrudability is required for production of these articles. Furthermore, the oxidatively crosslinked PPS is colored black to brown, and is difficult to color in various desired colors. In addition, molded articles of the oxidatively crosslinked PPS contain pores owing to the generation of a gas during melting. The cause of this is not entirely clear, but presumably, the main cause is the volatilization or decomposition of low-molecular-weight components present in the polymer. The presence of pores reduces the mechanical properties and electrical properties of molded articles of PPS. The gas consists mainly of organic materials and small amounts of $SO_2$ and $H_2S$ and corrodes metallic materials.

It is known from U.S. Pat. Nos. 4,038,261, 4,064,114 and 4,116,947 that high-molecular-weight PPS can be directly produced by polymerization alone. However, these methods require special polymerization catalysts, and because there is no suitable solvent which can dissolve PPS at not more than 200° C., a step of purifying the polymer is required in order to remove the polymerization catalysts. This adds to the cost of production.

It is an object of this invention to provide a resin composition composed of PPS, preferably PPS having a low degree of crosslinking, and an epoxy compound and optionally a reinforcing material, a filler and/or a fire retardant.

Another object of this invention is to provide a resin composition composed of PPS, an epoxy compound, another thermoplastic resin having melt viscosity of at least 1.000 poises and optionally a reinforcing material, a filler and/or a fire retardant.

The PPS used in this invention preferably contains at least 70 mole % of recurring structural units of the general formula

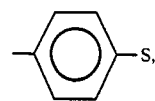

and if the proportion of these units is less than 70 mole %, a composition having excellent properties is difficult to obtain.

Examples of methods for obtaining this polymer include a method which comprises polymerizing p-dichlorobenzene in the presence of sulfur and sodium carbonate, a method which comprises polymerizing p-dichlorobenzene in a basic solvent in the presence of sodium sulfide, or sodium hydrosulfide and sodium hydroxide or hydrogen sulfide and sodium hydroxide, and a method comprising self-condensation of p-chlorothiophenol. One suitable method comprises reacting sodium sulfide and p-dichlorobenzene in an amide-type solvent such as N-methylpyrrolidone and dimethylacetamide or a sulfone-type solvent such as sulfolane. In this reaction, an alkali metal salt of a carboxylic or sulfonic acid or an alkali hydroxide is preferbly added in order to adjust the degree of polymerization of the polymer. As comonomer components, the polymer may contain a meta-linkage ( 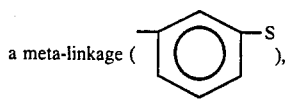 ), an ortho-linkage ( 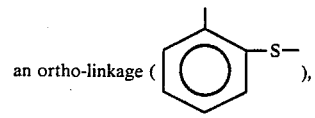 ), an ether linkage ( 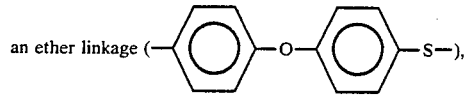 ), a sulfone linkage ( 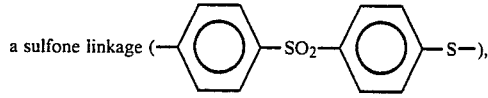 ), a biphenyl linkage ( 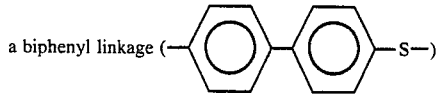 )

a substituted phenyl sulfide linkage ( 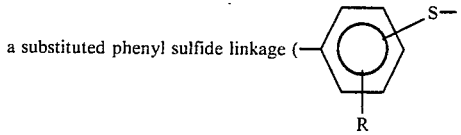 )

wherein R represents an alkyl group, a nitro group, a phenyl group, an alkoxy group, a carboxylic acid group or a metal carboxylate group), and a trifunctional linkage

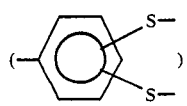

in amounts which do not greatly affect the crystallinity of the polymer, for example in an amount of less than 30 mole %, preferably not more than 10 mol %. When a trifunctional or higher phenyl, biphenyl, or naphthyl sulfide linkage is chosen as the comonomer components, the amount of the conomoner component is preferably not more than 3 mole %, more preferably not more than 1 mole %.

By the aforesaid polycondensation reaction, PPS is obtained as an uncrosslinked product which is nearly white. As such, however, the polymer has a low molecular weight and a low viscosity and cannot be extruded, injected or otherwise molded. In the prior art, products having a high molecular weight and a high viscosity suitable for injection molding are manufactured by oxidatively crosslinking the low-molecular-weight PPS of pale color having a melt viscosity of not more than 100 poises by heating it in the air at a temperature below its melting point (285° C.). Such products are marketed by Phillips Petroleum Co. under the tradename "Ryton P-4" and "Ryton P-6". They are colored brown as a result of oxidative crosslinking, and because they contain a three-dimensional crosslinking structure, the stability of their viscosity during molding is not satisfactory. In the present invention, PPS which has no crosslinked structure and cannot be used for injection molding because of its low viscosity and which has therefore a low degree of coloration is suitably used.

The degree of crosslinking of PPS can be expressed by the reaction between the melt viscosity (V) of the polymer and the non-Newtonean coefficient (N). When the logarithms of the shear speed of PPS and its shear stress obtained at the time of measuring the viscosity of the polymer are plotted, and the inclination of a tangent to a point at 300° C. and 200 (sec)$^{-1}$ is defined as the non-Newtonean coefficient N, the PPS preferably has an N of between 0.8 and 1.33+0.000047V. When N is outside this range, particularly when N exceeds the upper limit, the polymer is colored brown because of a high degree of oxidative crosslinking. When an epoxy compound is added to the polymer, no sufficient rise in melt viscosity is achieved. Furthermore, since the molding stability of such a polymer is not sufficient, it is difficult to obtain a composition having the properties specified in this invention. Especially preferably, N is between 0.8 and 1.25+0.000047V. In the present invention, PPS having no oxidatively crosslinked structure is especially preferred.

The melt viscosity (V), the shear speed (D) and the shear stress (T) are measured by a "Koka"-type flow tester or a melt indexer. All melt viscosities, as referred to in this application, are "apparent melt viscosities". These values are calculated from the following three equations.

$T = PR/2L$ (dynes/cm$^2$)

$D = 4Q/\pi R^3$ (1/sec)

$V = T/D$ (poises)

wherein

R: the radius (cm) of the nozzle
L: the length (cm) of the nozzle
Q: the flow rate (cm$^2$/sec)
P: the extruding pressure (dynes/cm$^2$)

The non-Newtonian coefficient N is calculated from the following equation.

$N = d(\log D)/d(\log T)$

The melt viscosity and the non-Newtonian coefficient are measured at 300° C. and a shear speed of 200 (1/sec).

The epoxy compound to be mixed with PPS is a liquid or solid epoxy compound containing at least one epoxy group. Diepoxy compounds having a molecular weight of 100 to 10,000 are preferred. Examples of the epoxy compound used in this invention include glycidyl ethers of bisphenols such as bisphenol A, resorcinol, hydroquinone, pyrocatechol, bisphenol F, saligenin, 1,3,5-trihydroxybenzene, trihydroxydiphenyldimethylmethane, 4,4'-dihydroxybiphenyl, 1,5-dihydroxynaphthalene, cashew phenol, dihydroxydiphenylsulfone and 2,2,5,5-tetrakis(4-hydroxyphenyl)hexane; glycidyl ethers of halogenated bisphenols, glycidyl ethers such as a diglycidyl ether of butanediol; glycidyl esters such as glycidyl phthalate; glycidylamines such as N-glycidylaniline; linear non-glycidyl epoxy resins such as epoxidized polyolefins and epoxidized soybean oils; cyclic non-glycidyl epoxy resins such as vinyl cyclohexane dioxide and dicyclopentadiene dioxide; and novolak phenol-type resins.

These epoxy compounds may be used singly or as a mixture of two or more. The novolak phenol-type epoxy resins are especially preferred. The novolak phenol-type epoxy resins usually contain at least two epoxy groups and are obtained by reacting novolak-type phenolic resins with epichlorohydrin. Preferred novolak phenol resins are those obtained by the condensation reaction of phenols and formaldehyde. There is no particular restriction on the starting phenols, but suitable phenols include phenol, o-cresol, m-cresol, p-cresol, bisphenol A, resorcinol, p-tertiary butyl phenol, bisphenol F, bisphenol S, and mixtures of these.

In a composition composed of PPS and the epoxy compound and optionally a reinforcing material, a filler and/or a fire retardant, the amount of the epoxy compound is 0.01 to 40 parts by weight, preferably 0.5 to 20 parts by weight, per 100 parts by weight of PPS.

The present invention includes a composition obtained by adding another thermoplastic resin having a melt viscosity of at least 1,000 poises, preferably 1,000 to 1,000,000 poises, at a temperature in the range of 230° to 370° C. to PPS and the epoxy resin. This composition also optionally includes a reinforcing material, a filler and/or a fire retardant.

The other thermoplastic resin is selected from polyesters, polyamides, polyarylates, polycarbonate, polyphenylene oxides, polyimides, polyamideimides, polyether ether ketones, polysulfones and elastomers. At least one of these is used.

The polyesters denote polyesters obtained from dicarboxylic acids such as terephthalic acid, isophthalic acid, ortho-phthalic acid, naphthalenedicarboxylic acid, 4,4'-diphenyldicarboxylic acid, diphenyl ether dicarboxylic acid, α,β-bis(4-carboxyphenoxy)ethane, adipic acid, sebacic acid, azelaic acid, decanedicarboxylic acid, dodecanedicarboxylic acid, cyclohexanedicarboxylic acid and dimeric acid or their ester-forming derivatives and glycols such as ethylene glycol, propylene glycol, butanediol, pentanediol, neopentyl glycol, hexanediol, octanediol, decanediol, cyclohexane dimethanol, hydroquinone, bisphenol A, 2,2-bis(4-hydroxyethoxyphenyl)-propane, xylylene glycol, polyethylene ether glycol, polytetramethylene ether glycol and aliphatic polyester oligomers having hydroxyl groups at both therminals. Usually, those having an intrinsic viscosity $[\eta]$, measured at 30° C. in a mixed solvent of phenol and tetrachloroethane in a weight ratio of 6:4, of 0.3 to 1.5 dl/g.

As comonomer components, the polyesters may include hydroxycarboxylic acids such as glycollic acid, hydroxybutyric acid, hydroxybenzoic acid, hydroxyphenylacetic acid and naphthylglycollic acid; lactone compounds such as propiolactone, butyrolactone, valerolactone and caprolactone; or polyfunctional ester-forming components such as trimethylolpropane, trimethylolethane, glycerol, pentaerythritol, trimellitic acid, trimesic acid and pyromellitic acid in amounts which can maintain the polyesters thermoplastic.

There can also be used thermoplastic polyester resins having copolymerized therewith halogen compounds having halogen as a substituent on the aromatic ring and an ester-forming group, such as dibromoterephthalic acid, tetrabromoterephthalic acid, tetrabromophthalic acid, dichloroterephthalic acid, tetrachloroterephthalic acid, 1,4-dimethyloltetrabromobenzene, tetrabromobisphenol A or an ethylene oxide adduct of tetrabromobisphenol A.

Especially preferred polyesters include polybutylene terephthalate, polyhexamethylene terephthalate, poly(ethylene-butylene terephthalate), poly(cyclohexanedimethylene terephthalate), poly(butylene-tetramethylene-terephthalate), and 2,2-bis($\beta$-hydroxyethoxytetrabromophenyl)propane-copolymerized polybutylene terephthalate.

Various known polyamides can be used. Examples include polyamides obtained by polycondensing dicarboxylic acids such as oxalic acid, adipic acid, suberic acid, sebacic acid, terephthalic acid, isophthalic acid and 1,4-cyclohexyldicarboxylic acid and diamones such as ethylenediamine, pentamethylenediamine, hexamethylenediamine, decamethylenediamine, 1,4-cyclohexyldiamine and m-xylylenediamine; polyamides obtained by polymerizing cyclic lactams such as caprolactam and laurolactam; and polyamides obtained by copolymerizing cyclic lactams and dicarboxylic acid diamine salts. Of these polyamides, 6-nylon, 66-nylon, 6/10-nylon, 66/6.10-nylon, 6/66-nylon, 12-nylon, 11-nylon and 6/6T-nylon (a copolymer of caprolactam, and a hexamethylenediamine salts of terephthalic acid) are preferred. 6-Nylon and 66-nylon are especially preferred.

The polycarbonates may be homogeneous polymers or copolymers. Examples are those based on at least one of the following bisphenols: hydroquinone, resorcinol, dihydroxydiphenyl, bis(hydroxyphenyl)alkanes, bis-(hydroxyphenyl)cycloalkanes, bis-(hydroxyphenyl)sulfide, bis-(hydroxyphenyl)ketone, bis-(hydroxyphenyl)ether, bis-(hydroxyphenyl)sulfoxide, bis-(hydroxyphenyl)sulfone and $\alpha,\alpha'$-bis-(hydroxyphenyl)-diisopropylbenzene and products resulting from substituting alkyl or halogen at the ring.

Specific examples of preferred bisphenols include 4,4-dihydroxydiphenyl, 2,2-bis-(4-hydroxyphenyl)propane, 2,4-bis-(4-hydroxyphenyl)-2-methylbutane, 1,1-bis-(4-hydroxyphenyl)cyclohexane, $\beta,\beta'$-bis(4-hydroxyphenyl)-p-diisopropylbenzene, 2,2-bis-(3-methyl-4-hydroxyphenyl)propane, 2,2-bis(3-chloro-4-hydroxyphenyl)propane, bis-(3,5-dimethyl-4-hydroxyphenyl)methane, 2,2-bis(3,5-dimethyl-4-hydroxyphenyl)propane, bis-(3,5-dimethyl-4-hydroxyphenyl)sulfone, 2,4-bis-(3,5-dimethyl-4-hydroxyphenyl)-2-mercaptan, 1,1-bis-(3,5-dimethyl-4-hydroxyphenyl)cyclohexane, $\alpha,\alpha'$-bis-(3,5-dimethyl-4-hydroxyphenyl)-p-diisopropylbenzene, 2,2-bis(3,5-dichloro-4-hydroxyphenyl)propane and 2,2-bis-(3,5-dibromo-4-hydroxyphenyl)propane. Especially preferred bisphenols are 2,2-bis-(4-hydroxyphenyl)propane, 2,2-bis-(3,5-dimethyl-4-hydroxyphenyl)propane, 2,2-bis-(3,5-dichloro-4-hydroxyphenyl)propane, 2,2-bis-(3,5-dibromo-4-hydroxyphenyl)propane and 1,1-bis(4-hydroxyphenyl)cyclohexane.

Preferred polycarbonates are those based on the aforesaid preferred bisphenols. Especially preferred copolycarbonates are copolymers of 2,2-bis-(4-hydroxyphenyl)propane and one of the especially preferred bisphenols given above.

Other especially preferred polycarbonates are those based on 2,2-bis-(4-hydroxyphenyl)propane or 2,2-bis-(3,5-dimethyl-4-hydroxyphenyl)propane.

The polycarbonates can be produced by known methods, for example by melt ester interchange reaction between bisphenols and diphenyl carbonate and two-phase interfacial polymerization of bisphenols and phosgene.

The polyarylates are polyesters synthesized from bisphenols or their derivatives and dibasic acids or their derivatives. Examples of the bisphenols include 2,2-bis-(4-hydroxyphenyl)propane, 4,4'-dihydroxy-diphenyl ether, 4,4'-dihydroxy-3,3'-dimethyl diphenyl ether, 4,4'-dihydroxy-3,3'-dichlorodiphenyl ether, 4,4'-dihydroxy-diphenyl sulfide, 4,4'-dihydroxy-diphenyl sulfone, 4,4'-dihydroxy-diphenyl ketone, bis-(4-hydroxyphenyl)methane, 1,1-bis-(4-hydroxyphenyl)ethane, 1,1-bis-(4-hydroxyphenyl)-n-butane, di-(4-hydroxyphenyl)cyclohexyl-methane, 1,1-bis-(4-hydroxyphenyl)-2,2,2-trichloroethane, 2,2-bis-(4-hydroxy-3,5-dibromophenyl)propane and 2,2-bis-(4-hydroxy-3,5-dichlorophenyl)propane. Of these, 2,2-bis-(4-hydroxyphenyl)propane, i.e. bisphenol A, is especially preferred.

Examples of the dibasic acids include aromatic dicarboxylic acids such as phthalic acid, isophthalic acid, terephthalic acid, bis-(4-carboxy)diphenyl, bis-(4-carboxyphenyl)-ether, bis-(4-carboxyphenyl)sulfone, bis-(4-carboxyphenyl)-carbonyl, bis-(4-carboxyphenyl)methane, bis-(4-carboxyphenyl)dichloromethane, 1,2- and 1,1-bis-(4-carboxyphenyl)ethane, 1,2- and 2,2-bis-(4-carboxyphenyl)propane, 1,2- and 2,2-bis-(3-carboxyphenyl)propane, 2,2-bis-(4-carboxyphenyl)-1,1-dimethylpropane, 1,1- and 2,2-bis-(4-carboxyphenyl)butane, 1,1- and 2,2-bis-(4-carboxyphenyl)pentane, 3,3-bis-(4-carboxyphenyl)heptane and 2,2-bis-(4-carboxyphenyl)-heptane; and aliphatic acids such as oxalic acid, adipic acid, succinic acid, malonic acid, sebacic acid, glutaric acid, azelaic acid, and suberic acid. Of these, isophthalic acid, terephthalic acid, their derivatives, and mixtures of these are preferred.

The polysulfones are defined as polyarylene compounds in which arylene units are positioned disorderly or orderly together with ether and sulfone linkages. Examples include those having the following structural units ① to ⑯. Those having the structure ① or ⑥ are preferred. In these structural formulae n represents an integer of 10 or more

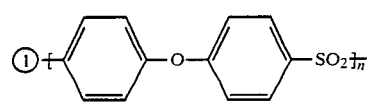
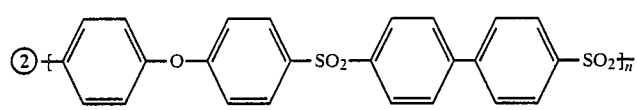
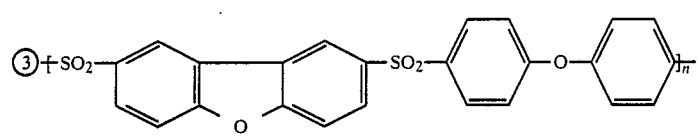
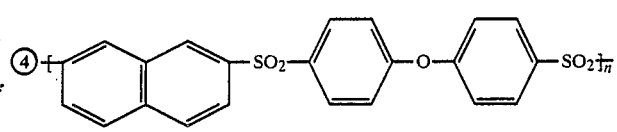
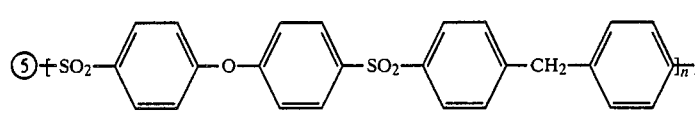
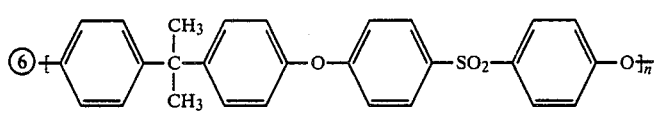
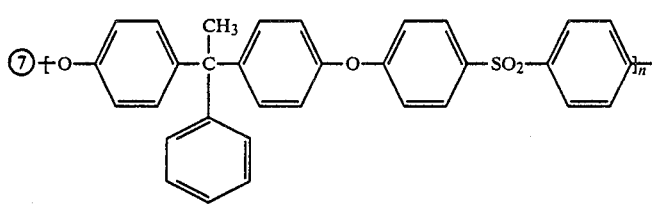
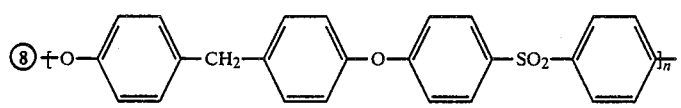
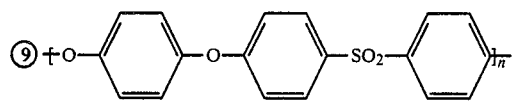
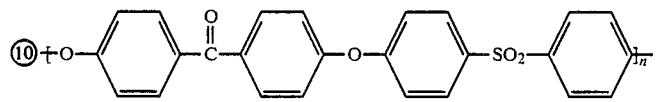
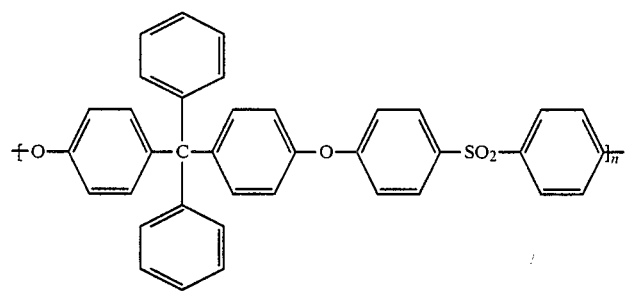

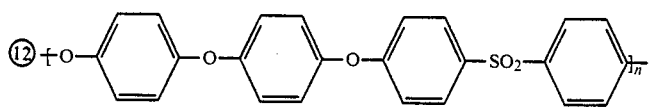
12

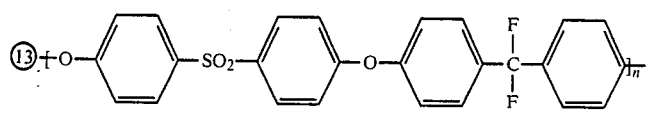
13

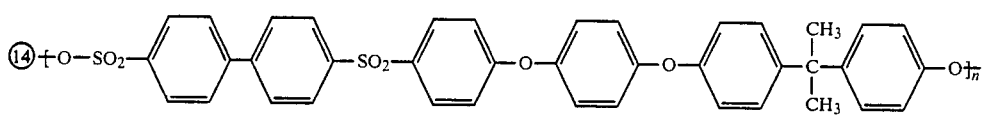
14

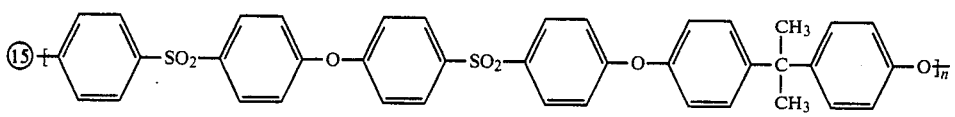
15

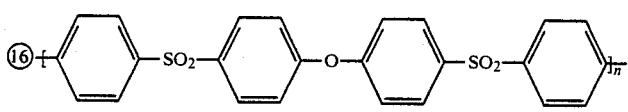
16

The polyphenylene oxides are also called polyphenylene ethers, and include, for example, 2,6-disubstituted phenol polymers having recurring structural units represented by the following formula

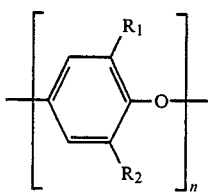

wherein $R_1$ and $R_2$ each represent a hydrogen atom, a halogen atom, a $C_{1-4}$ alkyl group, a $C_{1-4}$ haloalkyl group, a $C_{1-4}$ alkoxy group, a $C_{6-9}$ aryl group or a $C_{6-9}$ aralkyl group, and n is a integer of 10 or more, and polymers of 2,6-disubstituted phenols and polyhydric phenols (see Japanese Laid-Open Patent Publication No. 117,897/1975). Usually, they have a molecular weight of at least 2,000, preferably 10,000 to 35,000.

Although not restricted by the method of production, these resins are generally obtained by subjecting phenols such as phenol, 2,6-dimethylphenol, 2,6-diethylphenol, 2,6-diisopropylphenol or 2-methyl-6-methoxyphenol to dehydration reaction with oxygen in the presence of a co-catalyst such as a metal/amine, or a metal chelate/basic organic compound. Specific examples of the polyphenylene oxides are 2,6-dimethylphenylene oxide polymer, 2,6-dimethylphenol/bisphenol A (95/5 moles) copolymer and 2,6-diethylphenylene oxide polymer. Polyphenylene oxides having styrene grafted thereto may also be used.

The polyether ketones are tough crystalline thermoplastic aromatic polyether ketones containing recurring units of formula [1]

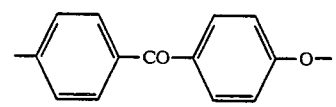
[1]

and/or recurring units of formula [2]

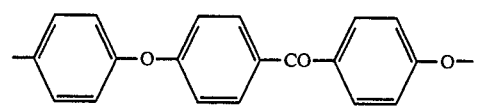
[2]

either singly or together with other recurring units and having an intrinsic viscosity of at least 0.7. The other recurring units than the recurring units of formulae [1] and [2] include the following recurring units of formulae [3] to [6].

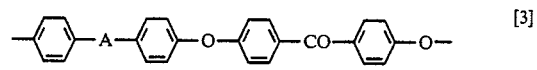
[3]

In formula [3], A represents a direct bond, oxygen, sulfur, —SO$_2$—, —CO— or a divalent hydrocarbon group.

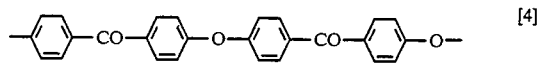
[4]

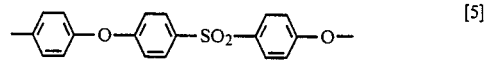
[5]

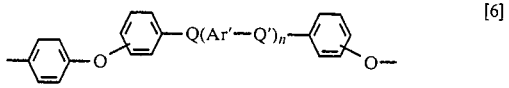
[6]

In formula [6], the oxygen atom of the sub-unit

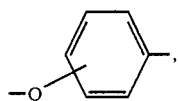

is ortho or para to the group Q or Q', Q and Q' are identical or different and each represents —CO— or —SO$_2$—, Ar' represents a divalent aromatic group, and n is 0, 1, 2 or 3.

The polyimides include, for example, polyimides having recurring units of the following general formula

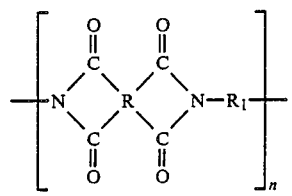

[I]

wherein R represents a tetravalent aromatic or alicyclic group containing at least one 6-membered carboxylic ring, R$_1$ represents a divalent benzenoid group represented by the formula

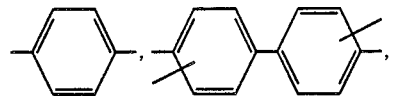

R$_2$ represents a divalent group selected from groups of the formulae

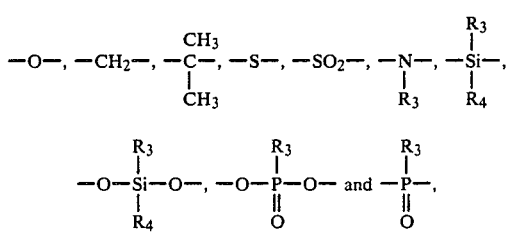

R$_3$ and R$_4$ are each selected from the class consisting of alkyl and aryl groups, and n is an integer of at least 2 which maintains the polymer thermally stable at a temperature of at least about 200° C.; polyimides having structural units represented by the following general formula

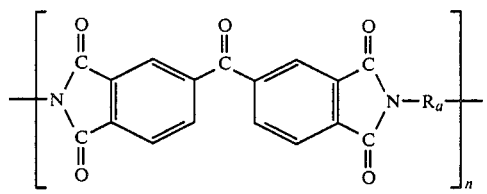

[II]

wherein R$_a$ represents a group of the formula

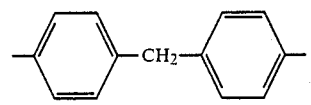

in 10 to 90% of the recurring units and a group of the following formula

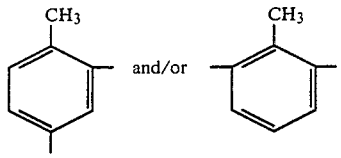

in the remainder of the recurring units, and n is an integer of at least 2 which maintains the polymer thermally stable at a temperature of at least about 200° C.; and polyimides having recurring units of the general formula

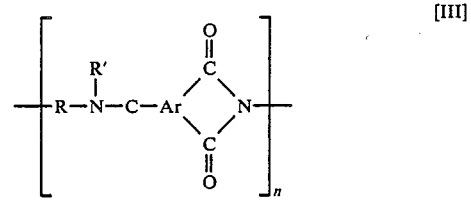

[III]

wherein Ar represents a trivalent aromatic group containing at least one 6-membered carboxylic ring, R represents a divalent aromatic and/or aliphatic group, R' represents a hydrogen atom, a methyl group or a phenyl group, and n is an integer of at least 2.

Suitable elastomers for use in this invention are, for example, polyamide-type elastomers and polyester-type elastomers. They may be used either singly or in combination.

Examples of preferred polyamide-type elastomers are elastomeric block copolymers having hard segments of nylon 11 and nylon 12 and soft segments of polyester or polyester components. Specific examples of the polyether component are —(OR)$_n$— in which R is a C$_2$–C$_{12}$ alkylene group. Specific examples of the polyester components are polymer structures starting from polycaprolactone or HO—R—OH (R is a C$_2$–C$_{12}$ alkylene group) and (R$_1$)—(COOH)$_{2-3}$. A typical example is "Grilamide" (tradename) available from EMS Chemie Company. There can also be used random copolymers of nylon 6, nylon 66, nylon 610, nylon 11 and nylon 12.

Examples of preferred polyester-type elastomers are block copolymers of high-melting hard segments composed mainly of alkylene terephthalate units and low-melting soft segments composed of aliphatic polyesters or polyethers. The segments composed mainly of alkylene terephthalate units constituting the high-melting segments consist mainly of units derived from terephthalic acid and alkylene glycols such as ethylene glycol, propylene glycol, tetramethylene glycol, pentamethylene glycol, 2,2-dimethyl-trimethylene glycol, hexamethylene glycol and decamethylene glycol. These segments may optionally contain small amounts of aromatic dicarboxylic acids such as isophthalic acid, 1,5-naphthalenedicarboxylic acid, 2,6-naphthalenedicarboxylic acid, dibenzoic acid, bis(p-carboxylphenyl)methane or 4,4'-sulfonyldibenzoic acid, aliphatic dicarboxylic acids, diols such as p-xylylene glycol and cyclohexane dimethanol, and hydroxycarboxylic acids such as p-hydroxybenzoic acid or p-(β-hydroxyethoxy)benzoic acid.

Examples of the low-melting soft segments composed of aliphatic polyesters or polyethers include polyether glycols such as poly(ethylene oxide)glycol, poly(propylene oxide)glycol, or poly(tetramethylene oxide)glycol, mixtures of these polyether glycols or copolymers thereof, polyesters prepared from aliphatic dicarboxylic acids having 2 to 12 carbon atoms and aliphatic glycols having 2 to 10 carbon atoms (e.g., polyethylene adipate, polytetramethylene adipate, polyethylene sebacate, polyneopentyl sebacate, polytetramethylene dodecanate, polytetramethylene azelate, polyhexamethylene azelate or poly-(epsilon-caprolactone), and polyester-polyether copolymers composed of combinations of the aliphatic polyesters and the aliphatic polyethers.

In the polyester-type block copolymers, the low-melting soft segments have a molecular weight of preferably 400 to 6,000, and the preferred proportion of the low-melting soft segments in the copolymers is 5 to 80% by weight.

These polyester-type block copolymers can be produced by an ordinary polycondensation method. Suitable methods include a method which comprises heating terephthalic acid or dimethyl terephthalate, a diol capable of forming a low-melting segment, and a low-molecular-weight diol in the presence of a catalyst to a temperature of about 150° to about 250° to perform esterification or ester-interchange reaction, and thereafter, polycondensing the resulting product in vacuum while removing the excess of the low-molecular-weight diol; a method which comprises reacting a separately prepared high-melting polyester segment-forming prepolymer and a separately prepared prepolymer capable of forming a low-melting polymer segment with a difunctional compound capable of reacting with the terminal functional groups of these prepolymers, and thereafter maintaining the reaction mixture under high vacuum to remove volatile components; and a method which comprises mixing a high-melting polyester having a high degree of polymerization and a lactone monomer under heat, and subjecting them to ester interchange reaction while performing ring-opening polymerization of the lactone.

Typical examples of the polyester-type block copolymers are those marketed under the tradenames "Pelprene" by Toyo Spinning Co., Ltd. and "Hytrel" by E. I. du Pont de Nemours & Co.

In the composition of this invention, the amount of the other thermoplastic resin to be added is usually 1 to 99 parts by weight for 99 to 1 part by weight of PPS.

Since various other thermoplastic resins can be used, the preferred amounts of these other thermoplastic resins differ depending upon their selection and the purpose for which they are incorporated.

For example, when a polyester is used as the other resin, its amount is preferably 10 to 60 parts by weight for 90 to 40 parts by weight of PPS, particularly 10 to 50 parts by weight for 90 to 50 parts by weight of PPS, in order to improve flexural strength and the compatibility of the resins. To obtain excellent mechanical strength and improved moldability, the suitable amount of the polyester is 99 to 60 parts by weight for 1 to 40 parts by weight of PPS, especially 95 to 60 parts by weight for 5 to 40 parts of PPS.

In the case of elastomers, the suitable amount is 1 to 66.7 parts by weight for 99 to 33.3 parts by weight of PPS, particularly 5 to 50 parts by weight for 95 to 50 parts by weight of PPS.

In the case of polycarbonates, polyphenylene oxides, polyamides, polyarylates, polyimides, polyamideimides, polyether ether ketones and polysulfones, the amount suitable is 99 to 1 parts by weight for 1 to 99 parts by weight of PPS, particularly 10 to 90 parts by weight for 90 to 10 parts by weight of PPS.

When the other thermoplastic resins are to be added to PPS, the suitable amount of the epoxy compound is 0.01 to 40 parts by weight, especially 0.1 to 25 parts by weight, per 100 parts by weight of the PPS and the other thermoplastic resins combined.

Generally, epoxy resins are molded after a curing agent such as amines, acid anhydrides polysulfides or phenolic resins has been incorporated therein. In the present invention, it is desirable not to use any curing agent. But if any curing agent is necessary, it should be used in such an amount that the mole ratio of active hydrogen to the epoxy groups is not more than 0.5.

A fire retardant, a reinforcing agent, a filler, etc. may be optionally added to the compositions of this invention.

There is no particular restriction on the structure and chemical composition of the fire retardants. It is necessary however that at a temperature elevating rate of 10° C./min. in air, the temperature at which the fire retardants begin to undergo weight loss is at least 260° C. (a point at which a 5% weight loss occurs) or higher, preferably at least 280° C. When the temperature at which the weight loss of the fire retardants begins at less than 260° C., their decomposition and sublimation may occur during molding and processing operations such as pellet production and injection molding. Specific examples of the fire retardants include decabromodiphenyl ether, decabromobiphenyl tetrabromobisphenol A 2-hydroxyethyl ether, a polycondensate of 2,4,6-tribromophenol, ethylenebistetrabromophthalimide, polycarbonate oligomer tris(dibromophenyl)phosphate starting from tetrabromobisphenol A, a compound of the following formula

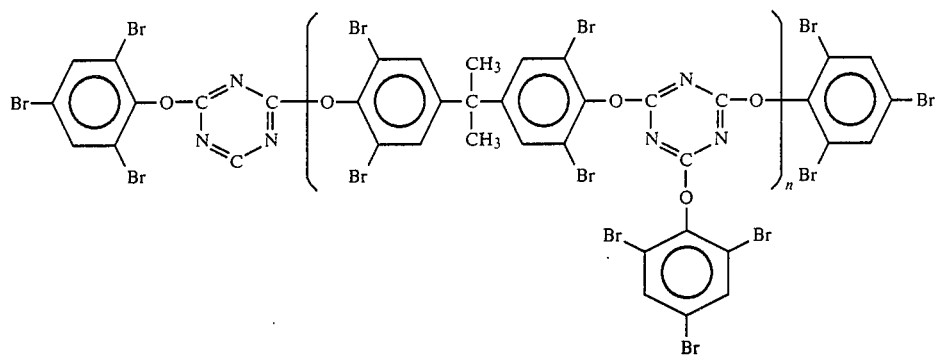

Pyrochek 77B (tradename, Ferro Corporation) and brominated polystyrene.

The amount of the fire retardant is preferably 0.1 to 50 parts by weight per 100 parts by weight of the resin components of the composition. If the amount is less than the lower specified lower limit, the resulting composition has insufficient fire retardancy, and cannot achieve levels V-0 and V-1 stipulated in UL standards. If it exceeds 50 parts by weight, the mechanical strength of the resulting composition is reduced.

The fire retardant should be used together with a fire retarding aid composed of a metal oxide. Specific examples of the fire retarding aid include antimony trioxide, antimony pentoxide, antimony trisulfide, antimony trichloride, antimony pentachloride, antimony tribromide, antimony pentabromide, barium metaborate, lead borate, aluminum hydroxide, zirconium oxide and molybdenum oxide. Antimony trioxide is especially suitable. The amount of the retarding aid is 0.1 to 20 parts by weight per 100 parts by weight of the resin components.

The compositions of this invention may contain up to 80% by weight, preferably 0 to 75% by weight, based on the total weight of the compositions, of a fibrous reinforcing material such as glass fibers, carbon fibers, potassium titanate, asbestos, silicon carbide, ceramic fibers, metallic fibers and silicon nitride; an inorganic filler such as barium sulfate, calcium sulfate, kaolin, clay, pyrophyllite, bentonite, sericite, zeolite, mica, nepheline syenite, talc, attapulgite, wollastonite, PMF (processed mineral fibers), ferrite, calcium silicate, calcium carbonate, magnesium carboante, dolomite, antimony trioxide, zinc oxide, titanium oxide, magnesium oxide, iron oxide, molybdenum disulfide, graphite, gypsum, glass beads, glass balloons, quartz and quartz glass; and an organic reinforcing filler such as Alamide fibers. When these reinforcing materials or fillers are to be added, known silane coupling agents may be used. Lubricants such as fluorine resins and molybdenum compounds may also be used.

It is also possible to include mold releasing agents, coloring agents, heat stabilizers, ultraviolet stabilizers, weather stabilizers, foaming agents, and rustproofing agents into the compositions of this invention in amounts which do not deviate from the objects of this invention. Likewise, other polymers may be mixed with the composition of this invention. Examples of such polymers include homopolymers, block copolymers and graft copolymers derived from such monomers as ethylene, propylene, butylene, pentene, butadiene, isoprene, chloroprene, styrene, -methyl-styrene, vinyl acetate, vinyl chloride, acrylic acid esters, methacrylic acid esters, or (meth)acrylonitrile; silicone resins; phenoxy resins; and fluorine resins.

The compositions of this invention may be prepared by various known methods. For example, they may be prepared by mixing the raw materials uniformly in a mixer such as a Henschel mixer or tumbler, feeding the mixture into a single screw or twin screw extruder, melt-kneading it at 230° to 400° C., and pelletizing the mixture. To promote the reaction of PPS with the epoxy compound, it is preferred to add the epoxy compound in two or more divided portions to PPS and perform the extruding operation two or more times in the melt-kneading and extruding process.

The compositions of this invention can be molded not only by injection molding and compression molding, but also by extrusion, blow molding and foaming molding, into films, sheets, monofilaments and fibers. Heating the resulting molded articles at 200° to 300° C. in vacuum or in the presence of oxygen gas can lead to a further improvement in heat resistance.

The following examples illustrate the present invention in greater detail. All percentages and parts in these examples are by weight.

REFERENTIAL EXAMPLE 1

Sodium sulfide (purity 60%; 98.4 g) and 4.7 g of sodium hydroxide were added to 3,080 g of N-methylpyrrolidone, and the mixture was heated to 205° C. while dehydrating. Thereafter, 1,113 g of p-dichlorobenzene and 510 g of N-methylpyrrolidone were added, and the mixture was heated under pressure at 262° C. for 5 hours. The reaction product was cooled, washed with water and dried to give PPS having a melt viscosity of 40 poises and a non-Newtonian coefficient of 0.95. The product is designated as polymer A.

The polymer A was heat-cured at 270° C. in air for 3 hours and 3.7 hours, respectively to give a crosslinked polymer having a melt viscosity of 1,800 poises and a non-Newtonian coefficient of 1.17 (polymer B) and a crosslinked polymer having a melt viscosity of 3,600 poises and a non-Newtonian coefficient of 1.42 (polymer C).

When polymer A was heat-cured in air at 260° C. for a period of 5 hours and 7 hours, respectively, there were obtained a crosslinked polymer having a melt viscosity of 310 poises and a non-Newtonian coefficient of 1.13 (polymer D) and a crosslinked polymer having a melt viscosity of 1,000 poises and a non-Newtonian coefficient of 1.25 (polymer E).

EXAMPLE 1

Polymer A, B, C, D or E prepared in Referential Example 1 and a novolak phenol-type epoxy resin (Epiclon N-695, a tradename for a product of Dainippon Ink and Chemicals, Inc.) or an epoxy resin (Epiclon 4050, a tradename for a product of Dainippon Ink and Chemicals, Inc.) were uniformly pre-mixed in the proportions shown in Table 1. The mixture was melt-kneaded at 290° to 300° C. in a twin-screw extruder (screw diameter 50 mm; rotating in the same direction) to form pellets. The pellets were put in a single-screw extruder having a screw diameter of 40 mm, and extruder at a cylinder temperature and a die temperature of 290° to 300° C. and a screw rotating speed of 30 to 35 rpm under an extruding pressure of 60 to 80 kg/cm² to form a sheet-like molded article having a thickness of 2.5 mm and a width of 150 mm. The surface condition and the inside condition of the resulting sheet are shown also in Table 1. Various test specimens were cut out from the sheet, and their properties were measured. The results are shown in Table 1.

It is seen from Table 1 that the molded articles obtained from the compositions of this invention had a smooth surface with no pores inside and were compact, and that they also had excellent mechanical strength.

In accordance with the compounding recipes shown in Table 2, sheets were prepared in the same way as above. The properties of the resulting sheets are summarized in Table 2.

TABLE 1

| No. (*1) | PPS Polymer | PPS Characteristics V (poises) | PPS Characteristics N | PPS Characteristics 1.33 + 0.000047V | Blending proportions (parts) PPS | Blending proportions (parts) Epoxy compound (*3) | Melt viscosity of the composition (poises) | Extrusion mold-ability (*2) | Appearance and color of the sheet | Inside condition of the sheet (the presence of pores) | Flexural strength (kg/cm²) of the sheet (ASTM D790) |
|---|---|---|---|---|---|---|---|---|---|---|---|
| 1* | A | 40 | 0.95 | 1.331 | 100 | 0 | 34 | X | — | — | — |
| 2 | A | " | " | " | 100 | 15 | 5010 | Good | Smooth, pale yellow | No | 620 |
| 3* | B | 1800 | 1.17 | 1.42 | 100 | 0 | 1750 | X | — | — | — |
| 4 | B | " | " | " | 100 | 10 | 5200 | Good | Smooth, pale yellow | No | 640 |
| 5 | C | 3010 | 1.33 | 1.47 | 100 | 7 | 4800 | Good | Smooth, pale yellow | No | 650 |
| 6* | D | 310 | 1.13 | 1.34 | 100 | 0 | 300 | X | — | — | — |
| 7 | D | " | " | " | 100 | 13 | 5800 | Good | Smooth, pale yellow | No | 640 |
| 8* | E | 1000 | 1.25 | 1.38 | 100 | 0 | 950 | X | — | — | — |
| 9 | E | " | " | " | 100 | 10 | 6010 | Good | Smooth, pale yellow | No | 640 |
| 10 | A | 40 | 0.95 | 1.331 | 100 | 15 | 10800 | " | Smooth, pale yellow | " | 870 |
| 11 | B | 1800 | 1.17 | 1.42 | 100 | 10 | 17600 | " | Smooth, pale yellow | " | 920 |
| 12 | C | 3010 | 1.33 | 1.47 | 100 | 7 | 15100 | Good | Smooth, pale yellow | No | 910 |
| 13 | D | 310 | 1.13 | 1.34 | 100 | 13 | 15900 | " | Smooth, pale yellow | " | 890 |
| 14 | E | 1000 | 1.25 | 1.38 | 100 | 10 | 12000 | " | Smooth, pale yellow | " | 880 |

(*1): The asterisked runs are comparative runs.
(*2): The X marks show that sheet formation was impossible because of the low viscosity of the composition.
(*3): In Runs Nos. 1 to 9, Epiclon 4050 (a diepoxy compound obtained from bisphenol A and epichlorohydrin and having an epoxy equivalent of 960) was used, and in Runs Nos. 10 to 14, Epiclon N-695 (a novolak phenol-type diepoxy compound having an epoxy equivalent of 242) was used.

TABLE 2

| | PPS Type | PPS Characteristics V (poises) | PPS Characteristics N | PPS Characteristics 1.33 + 0.000047V | Proportions (parts) PPS | Proportions (parts) Epoxy compound Epiclon 4050 | Proportions (parts) Epoxy compound Epiclon N-695 | Proportions (parts) Glass fibers | Proportions (parts) Talc | Properties of the molded article Color | Properties of the molded article Flexural strength (kg/cm²) (ASTM D790) | Properties of the molded article Spiral flow (cm) (*1) |
|---|---|---|---|---|---|---|---|---|---|---|---|---|
| 15 | Polymer-C | 3010 | 1.33 | 1.47 | 100 | 3 | — | 40 | 40 | Smooth, pale yellow | 1450 | 20 |
| 16 | " | " | " | " | 100 | — | 5 | 40 | 40 | Smooth, pale yellow | 1720 | 7 |
| 17 | Polymer-D | 310 | 1.13 | 1.34 | 100 | 10 | — | 40 | 40 | Smooth, pale | 1430 | 23 |

TABLE 2-continued

| | PPS | | | Proportions (parts) | | | | | Properties of the molded article | |
|---|---|---|---|---|---|---|---|---|---|---|
| | | Characteristics | | | Epoxy compound | | | | Flexural strength | Spiral |
| Type | V (poises) | N | 1.33 + 0.000047V | PPS | Epiclon 4050 | Epiclon N-695 | Glass fibers | Talc | Color | (kg/cm²) (ASTM D790) | flow (cm) (*1) |
| 18 | " | " | " | " | 100 | — | 6 | 40 | 40 | yellow Smooth, pale yellow | 1750 | 10 |

(*1): The spiral flow is the length of a resin filled in a spiral channel having a cross-sectional area of 26 mm² (width 12 mm) and a thickness of 3 mm.

EXAMPLE 2

Sheets were produced in the same way as in Example 1 in accordance with the compounding recipes shown in Table 3. The properties of these sheets are summarized in Table 3.

EXAMPLE 3

Sheets were produced in the same way as in Example 1 in accordance with the compounding recipes shown in Table 4. The properties of these sheets are summarized in Table 4.

TABLE 3

| | | Run No. | | | | | | | |
|---|---|---|---|---|---|---|---|---|---|
| | | 19 | 20 | 21 | 22 | 23 | 24 | 25 | 26 |
| Blending proportions (parts) | | | | | | | | | |
| PBT | Novadur 5010 | 63 | 63 | 70 | 70 | — | — | 63 | — |
| | Novadur 5008 | — | — | — | — | 47 | 47 | — | 47 |
| Polyethylene terephthalate (melt viscosity 3,500 poises at 280° C.) | | — | — | — | — | — | — | — | — |
| PPB | Polymer B | 30 | — | 30 | — | 20 | — | 30 | 20 |
| | Ryton P-4 | — | 30 | — | 30 | — | 20 | — | — |
| Epoxy resin (Epiclon 7050) | | 7 | 7 | — | — | 3 | 3 | — | — |
| Epoxy resin (Epiclon N-695) | | — | — | — | — | — | — | 7 | 3 |
| Fire retardant (FIRE MASTER TSA) | | — | — | — | — | — | — | — | — |
| Fire retardant acid (antimony trioxide) | | — | — | — | — | — | — | — | — |
| Glass fibers (Glasslon CS03 MA411) | | — | — | — | — | 60 | 60 | — | 60 |
| Properties | | | | | | | | | |
| Appearance of the molded article | | Good | Good | Poor | Poor | Good | Good | Good | Good |
| Flexural | Initial | 770 | 700 | 470 | 520 | 1820 | 1650 | 770 | 1800 |
| strength | After PCT (123° C./50 hours in hot water) | 690 | 590 | 150 | 180 | 1640 | 1250 | 700 | 1450 |
| (kg/cm²) | Percent retention after PCT | 90 | 84 | 32 | 35 | 90 | 75 | 91 | 81 |
| Heat distortion temperature (°C.) (18.6 kg/cm²) | | 85 | 82 | 79 | 80 | 28 | 25 | 86 | 90 |
| Fire retardancy (UL-94) | | HB | HB | HB | HB | HB | HB | HB | HB |

| | | Run No. | | | | | | | |
|---|---|---|---|---|---|---|---|---|---|
| | | 27 | 28 | 29 | 30 | 31 | 32 | 33 | 34 | 35 |
| Blending proportions (parts) | | | | | | | | | | |
| PBT | Novadur 5010 | 30 | 30 | 16 | 16 | — | — | — | — | — |
| | Novadur 5008 | — | — | — | — | 50 | 30 | — | — | — |
| Polyethylene terephthalate (melt viscosity) 3,500 poises at 280° C. | | — | — | — | — | — | — | 65 | 48 | 23 |
| PPB | Polymer B | 60 | 60 | 38 | 38 | 50 | 70 | 30 | 48 | 73 |
| | Ryton P-4 | — | — | — | — | — | — | — | — | — |
| Epoxy resin (Epiclon 7050) | | 10 | — | 6 | — | — | — | — | — | — |
| Epoxy resin (Epiclon N-695) | | — | 10 | — | 6 | 3 | 4 | 5 | 4 | 4 |
| Fire retardant (FIRE MASTER TSA) | | — | — | — | — | 7 | 7 | 7 | — | — |
| Fire retardant acid (antimony trioxide) | | — | — | — | — | 3 | 3 | 3 | — | — |
| Glass fibers (Glasslon CS03 MA411) | | — | — | 75 | 75 | 75 | 75 | 75 | 75 | 75 |
| Properties | | | | | | | | | | |
| Appearance of the molded article | | Good | Good | Good | Good | Good | Good | Good | Good | Good |
| Flexural | Initial | 830 | 790 | 1920 | 1880 | 1890 | 1910 | 1870 | 1890 | 1950 |
| strength | After PCT (123° C./50 hours in hot water) | 750 | 730 | 1760 | 1690 | 1740 | 1740 | 1646 | 1701 | 1794 |
| (kg/cm²) | Percent retention after PCT | 90 | 92 | 92 | 90 | 92 | 91 | 88 | 90 | 92 |
| Heat distortion temperature (°C.) (18.6 kg/cm²) | | 95 | 100 | 140 | 135 | 170 | 180 | 165 | 199 | 203 |
| Fire retardancy (UL-94) | | HB | HB | HB | HB | V-O | V-O | V-O | HB | HB |

Note to Table 3
PBT (polybutylene terephthalate: Novadur 5010 (melt viscosity 3,000 poises; 280° C.), Novadur 5008 (melt viscosity 3,500 poises, 280° C.)
PPS: Polymer B (synthesized in Referential Example 1), Ryton P-4 (melt viscosity 4,400 poises, non-Newtonean coefficient 1.63)
Epoxy resins: Epiclon 7050 (bisphenol A-type diepoxy compound having an epoxy equivalent of 1.920, a product of Dainippon Ink and Chemicals, Inc.); Epiclon N-659 (above stated)
Glass fibers: Glasslon CS03 MA411 (made by Asahi Glass Co., Ltd.)
Fire retardant: FIRE MASTER ® TSA (a trademark for a product of Velsicol Corp.; Br content 65%, weight loss start temperature [370° C. (5% loss, in air, temperature raising rate 10° C./min.]
PCT: Pressure cooker test

TABLE 4

| | Run No. |
|---|---|

TABLE 4-continued

|  | 36 | 37 | 38 | 39 | 40 | 41 | 42 | 43 | 44 | 45 | 46 |
|---|---|---|---|---|---|---|---|---|---|---|---|
| Blending proportions (parts) | | | | | | | | | | | |
| PPS (Polymer B) | 70 | 30 | 70 | 30 | 70 | 30 | 70 | 30 | 70 | 30 | 70 |
| Polyamide | 30 | 70 | | | | | | | | | |
| Polycarbonate | | | 30 | 70 | | | | | | | |
| Polyarylate | | | | | 30 | 70 | | | | | |
| Polyether ether ketone | | | | | | | 30 | 70 | | | |
| Polyamideimide | | | | | | | | | 30 | 70 | |
| Polyimide | | | | | | | | | | | 30 |
| Polyether sulfone | | | | | | | | | | | |
| Polysulfone | | | | | | | | | | | |
| Polyamide-type elastomer | | | | | | | | | | | |
| Polyester-type elastomer | | | | | | | | | | | |
| Polyphenylene oxide | | | | | | | | | | | |
| Epoxy compound | 3 | 3 | 5 | 5 | 5 | 5 | 5 | 5 | 3 | 3 | 3 |
| Glass fibers | 45 | 45 | 45 | 45 | | | | | | | |
| Properties of the composition | | | | | | | | | | | |
| Compatibility (appearance of the molded article) | Good | Good | Good | Good | Good | Good | Good | Good | Good | Good | Good |
| Flexural strength (kg/cm$^2$) | 1940 | 1970 | 1850 | 1780 | 920 | 860 | 880 | 1020 | 780 | 890 | 970 |
| Izod impact strength (kg-cm/cm, notched) | 7.8 | 9 | 10.5 | 15.3 | 4 | 10 | 3 | 4 | 3 | 4 | 3.8 |
| Water resistance test (50% RH/23° C., Equilibrium absorption) | | | | | | | | | | | |
| Flexural strength (kg/cm$^2$) | 1610 | 1400 | 1510 | 1380 | 820 | 760 | 850 | 960 | 750 | 820 | 810 |
| Weight increase (%) | 0.67 | 1.75 | 0.34 | 1.15 | 0.95 | 2.00 | 0.05 | 0.03 | 0.84 | 1.55 | 0.94 |
| Heat distortion temperature (°C.) | 204 | 215 | 203 | 214 | 141 | 155 | 175 | 205 | 165 | 205 | 210 |

|  | Run No. | | | | | | | | | | |
|---|---|---|---|---|---|---|---|---|---|---|---|
|  | 47 | 48 | 49 | 50 | 51 | 52 | 53 | 54 | 55 | 56 | 57 |
| Blending proportions (parts) | | | | | | | | | | | |
| PPS (Polymer B) | 30 | 70 | 30 | 70 | 30 | 100 | 100 | 100 | 100 | 70 | 30 |
| Polyamide | | | | | | | | | | | |
| Polycarbonate | | | | | | | | | | | |
| Polyarylate | | | | | | | | | | | |
| Polyether ether ketone | | | | | | | | | | | |
| Polyamideimide | | | | | | | | | | | |
| Polyimide | 70 | | | | | | | | | | |
| Polyether sulfone | | 30 | 70 | | | | | | | | |
| Polysulfone | | | | 30 | 70 | | | | | | |
| Polyamide-type elastomer | | | | | | 30 | 100 | | | | |
| Polyester-type elastomer | | | | | | | | 30 | 100 | | |
| Polyphenylene oxide | | | | | | | | | | 30 | 70 |
| Epoxy compound | 3 | 5 | 5 | 5 | 5 | 3 | 3 | 3 | 3 | 5 | 5 |
| Glass fibers | | | | | | | 134 | | 134 | | |
| Properties of the composition | | | | | | | | | | | |
| Combatibility (appearance of the molded article) | Good | Good | Good | Good | Good | Good | Good | Good | Good | Good | Good |
| Flexural strength (kg/cm$^2$) | 880 | 850 | 980 | 840 | 990 | 680 | 570 | 690 | 610 | 800 | 850 |
| Izod impact strength (kg-cm/cm, notched) | 4.3 | 3 | 5 | 12 | 9 | 5.2 | 7.9 | 4.5 | 7.5 | 4 | 4 |
| Water resistance test (50% RH/23° C., equilibrium absorption) | | | | | | | | | | | |
| Flexural strength (kg/cm$^2$) | 780 | 770 | 900 | 790 | 890 | 600 | 500 | 500 | 490 | 700 | 760 |
| Weight increase (%) | 1.54 | 0.55 | 0.45 | 0.60 | 0.55 | 1.0 | 0.8 | 1.4 | 2.0 | 0.6 | 0.6 |
| Heat distortion temperature (°C.) | 240 | 105 | 115 | 100 | 110 | 110 | 85 | 106 | 83 | 140 | 152 |

The various materials in Table 4 were as follows:
(1) PPS: Polymer B synthesized in Referential Example 1.
(2) Polyamide: 66 nylon (Leona 1,300 made by Asahi Chemical Industry Co., Ltd.; melt viscosity 300 poises at 260° C.)
(3) Polycarbonate: Novarex 7025 made by Mitsubishi Chemical Co., Ltd.; melt viscosity 18,000 poises at 280° C.
(4) Polyarylate: A product obtained by reacting terephthaloyl dichloride, isophthaloyl dichloride and 2,2-bis(4-hydroxyphenyl)propane in a mole ratio of 1:1:2 [logarithmic viscosity 0.65 (at 25° C.) determined for a solution of the polymer in a mixture of phenol and tetrachloroethane in a weight ratio of 60:40 in a concentration of 1 g/dl; melt viscosity 70,000 poises at 330° C.]
(5) Polyether ether ketone: a general molding grade having recurring molecular structural units of the formula

TABLE 4-continued

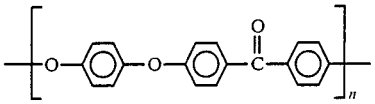

(wherein n is the degree of polymerization)
made by ICI (melt viscosity 4,800 poises at 360° C.).

(6) Polyamideimide: Torlon 4000T made by Amoco Company (melt viscosity 3,500 poises at 365° C.).
(7) Polyimide: "Polyimide" 2080 made by Upjohn Company (melt viscosity 6,000 poises at 360° C.)
(8) Polyether sulfone: VICTREX 200P made by ICI (melt viscosity 9,000 poises at 350° C.)
(9) Polysulfone: P-1700 made by Nissan Chemical Co., Ltd. (melt viscosity 50,000 poises at 310° C.)
(10) Polyamide-type elastomer: Grilamide ELY-1256 made by EMS Company (melt viscosity 2,000 poises at 230° C.)
(11) Polyester-type elastomer: Pelprene P-150B made by Toyo Spinning Co., Ltd. (melt viscosity 2,000 poises at 260° C.)
(12) Polyphenylene oxide: A polymer having recurring structural of the formula

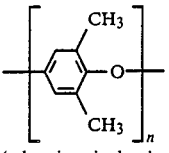

(wherein n is the degree of polymerization) (intrinsic viscosity 0.65; melt viscosity 35,000 poises at 316° C.)
(13) Epoxy compound: Epiclon N-695 (stated hereinabove)
(14) Glass fibers: Glasslon CS03 MA411 made by Asahi Fiber Co., Ltd. (fiber length 3mm).

What is claimed is:

1. A resin composition comprising (A) a polyphenylene sulfide, (B) an epoxy compound, (C) a thermoplastic resin other than (A) and having a melt viscosity of at least 1,000 poises at a temperature in the range of from 230° to 370° C. and (D) optionally a filler.

2. The composition of claim 1 wherein the epoxy compound (B) has a molecular weight of from 100 to 10,000.

3. The composition of claim 1 which comprises 100 parts by weight of the polyphenylene sulfide (A) and 0.01 to 40 parts by weight of the epoxy compound (B).

4. The composition of claim 1 wherein the other thermoplastic resin (c) is at least one polymer selected from the group consisting of polyesters, polyamides, polyarylates, polycarbonates, polyphenylene oxides, polyimides, polyamideimides, polyether ether ketones, polysulfones and elastomers selected from the group consisting of polyamide-type elastomers and polyester-type elastomers.

5. The composition of claim 1 wherein the polyphenylene sulfide (A) has a melt viscosity (V) of from 10 to 100,000 poises at a temperature of 300° C. and a shear speed of 200 (sec)$^{-1}$, and the following non-Newtonian coefficient (N) in relation to the melt viscosity (V)

$$0.8 \leq N \leq 1.33 + 0.000047V.$$

6. The composition of claim 1 wherein the epoxy compound (B) is a novolak phenol-type epoxy resin.

7. The composition of claim 1 which comprises 99 to 1 parts by weight of the polyphenylene sulfide (A) and 1 to 99 parts by weight of the thermoplastic resin (C).

* * * * *

UNITED STATES PATENT AND TRADEMARK OFFICE
CERTIFICATE OF CORRECTION

PATENT NO. : 4,528,346
DATED : July, 9, 1985
INVENTOR(S) : SUGIE ET AL.

It is certified that error appears in the above-identified patent and that said Letters Patent is hereby corrected as shown below:

On the title page;

Assignee: delete "Dainippun", insert --Dainippon--.

claim 4, line 2, delete "(c)", insert --(C)--.

Signed and Sealed this

First Day of October 1985

[SEAL]

Attest:

Attesting Officer

DONALD J. QUIGG

Commissioner of Patents and Trademarks—Designate